US006697528B1

(12) United States Patent
Numata (10) Patent No.: US 6,697,528 B1
(45) Date of Patent: Feb. 24, 2004

(54) IMAGE SYNTHESIS SYSTEM AND METHOD

(75) Inventor: Kohji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 681 days.

(21) Appl. No.: 09/666,525

(22) Filed: Sep. 20, 2000

(30) Foreign Application Priority Data

Sep. 24, 1999 (JP) .......................................... 11-271392

(51) Int. Cl.[7] ................................................ G06K 9/36
(52) U.S. Cl. ........................ 382/233; 382/284; 348/584; 348/589; 348/600; 345/636
(58) Field of Search ................................. 382/233, 284, 382/294; 348/584, 586, 589, 598, 600; 345/629, 632, 634, 636, 641

(56) References Cited

U.S. PATENT DOCUMENTS

| 5,408,274 A | * | 4/1995 | Chang et al. ................ 348/700 |
| 5,568,167 A | * | 10/1996 | Galbi et al. .................. 348/589 |
| 6,023,261 A | * | 2/2000 | Ugajin ......................... 345/634 |
| 6,061,099 A | * | 5/2000 | Hostetler .................... 348/584 |

OTHER PUBLICATIONS

Chang et al. "Manipulation and Compositing of MC–DCT Compressed Video." IEEE Journal of Selected Areas in Communications, vol.13, No.1, Jan. 1995, pp.1–11.*

Noguchi et al. "MPEG Video Compositing in the Compressed Domain." Int. Symp. on Circuits and Systems, ISCA '96, vol.2, May 12, 1996, pp.596–599.*

* cited by examiner

Primary Examiner—Jon Chang
(74) Attorney, Agent, or Firm—Dickstein, Shapiro, Morin & Oshinsky, LLP.

(57) ABSTRACT

An image synthesis system which makes it possible to refer to a decompressed image that has been stored in an image-data buffer as an image for predicting a succeeding frame at the time of MPEG decoding combines main image data that has been compressed by the MPEG method and subordinate image data that has been compressed by a method different from the MPEG method. The system includes a motion compensation processor for decompressing, on a per-macroblock basis, I-, P- and B-pictures of the main image data, which has first been subjected to inverse quantization and inverse DCT processing; a macroblock storage unit for storing a macroblock of the I-picture; and a subordinate-image macroblock generator for converting the subordinate image data to an MPEG macroblock, translucently combining data of a macroblock having a portion which overlaps the subordinate image and data of a macroblock that has been stored in the macrob lock storage unit, and creating data of the translucently combined macroblocks as a macroblock of the B-picture, which is decompressed by the motion compensation processor.

16 Claims, 8 Drawing Sheets

(a) SUBORDINATE DATA (b) FORMAT OF DATA IN SUBORDINATE-IMAGE FRAME BUFFER 132

SUBORDINATE-IMAGE FRAME DATA    SUBORDINATE-IMAGE COLOR TABLE (c) SUBORDINATE-IMAGE MACROBLOCK DATA

IMAGE SYNTHESIS SYSTEM AND METHOD

FIELD OF THE INVENTION

This invention relates to an image synthesis system and, more particularly, to an image synthesis system and method for combining image data that has been compressed by MPEG (Moving Picture Experts Group) coding and image data that has been compressed by run-length coding.

BACKGROUND OF THE INVENTION

Figure 8:
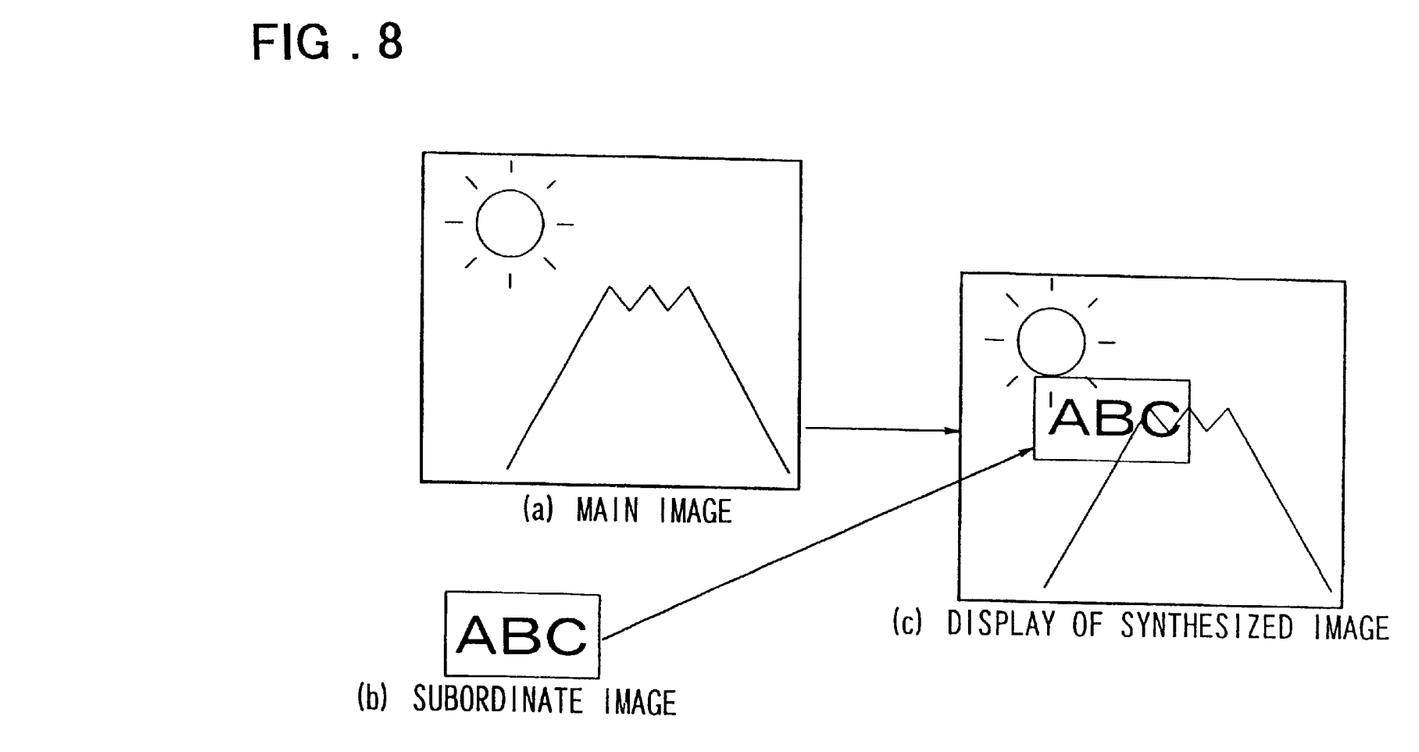
FIG. 8 is a diagram useful in describing an image synthesis system predicated on the present invention.

FIG. 8 is a diagram useful in describing an image synthesis system predicated on the present invention. In an image synthesis system predicated on the present invention, as illustrated in FIG. 8, main image data that has been compressed by MPEG coding and subordinate image data such as video or karaoke subtitles that has been compressed by the run-length method are each decoded, subjected to processing to combine the translucent images and then reproduced in the form of a display.

With the MPEG system, the reconstructed image is stored in an image-data buffer in such a manner that it may be referred to as an image for predicting the next frame in order to apply motion compensation.

SUMMARY OF THE DISCLOSURE

Various problems have been encountered in the prior art in the course of the investigation toward the present invention.

In a case where decoding processing such as MPEG decoding and run-length decoding and synthesis processing is implemented by software, however, the prior art is such that processing for combining the subordinate image with the main image is executed using the image-data buffer in which the MPEG-decoded image data has been stored. As a consequence, the reconstructed image that was stored in the image-data buffer following MPEG decoding is rewritten. Since the reconstructed image of the main image in the image-data buffer is thus combined with the subordinate image, a reconstructed image stored in the image-data buffer cannot be referred to as an image for predicting the next frame at the time of MPEG decoding.

Some personal computers come equipped with hardware for MPEG decoding and display moving pictures in accordance with the MPEG standard. Such personal computers cannot execute processing for combining translucent main and subordinate images unless the CPU has enough processing capability. For this reason, there are instances where the display unit of the personal computer is provided with special hardware.

Accordingly, an object of the present invention is to provide an image synthesis system and method which can be realized by software only without the provision of special hardware and which reduce the load associated with synthesis processing.

According to an aspect of the present invention, there is provided an image synthesis system for combining main image data that has been compressed by an MPEG method and subordinate image data that has been compressed by a method different from the MPEG method, the system comprising: a motion compensation processor decompressing, on a per-macroblock basis, I-, P- and B-pictures of the main image data, which has first been subjected to inverse quantization and inverse DCT processing; a macroblock storage unit storing a macroblock of the I-picture of the main image data; and a subordinate-image macroblock, generator converting the subordinate image data to an MPEG macroblock, translucently combining data of a macroblock having a portion which overlaps the subordinate image and data of a macroblock that has been stored in the macroblock storage unit, and creating data of the translucently combined macroblocks as a macroblock of the B-picture, which is decompressed by the motion compensation processor.

Thus, the image of a created B-picture combined with a subordinate image is decompressed by the motion compensation processor. This makes it possible to reconstruct a synthesized image. In addition, the load of synthesis processing is reduced and it is no longer necessary to provide special hardware for the display unit of a personal computer equipped with an MPEG decoder.

Further, according to a second aspect of the present invention, there is provided an image synthesis system for combining main image data that has been compressed by an MPEG method and subordinate image data that has been compressed by a method different from the MPEG method, the system comprising: a motion compensation (MC) processor decompressing, on a per-macroblock basis, I-, P- and B-pictures of the main image data, which has first been subjected to inverse quantization and inverse DCT processing, and performing control in such a manner that use is not made of reference I and P-pictures among the I- and P-pictures; a macroblock storage unit storing a macroblock of the I-picture of the main image data; and a subordinate-image macroblock generator for converting the subordinate image data to an MPEG macroblock, translucently combining data of a macroblock having a portion which overlaps the subordinate image and data of a macroblock that has been stored in the macroblock storage unit, and creating and decompressing data of the translucently combined macroblocks as macroblocks of the reference I- and P-pictures not utilized by the motion compensation processor.

Thus, the images of created I- and P-pictures combined with a subordinate image are decompressed by the motion compensation processor. This makes it possible to reconstruct a synthesized image. In addition, the load of synthesis processing is reduced and it is no longer necessary to provide special hardware for the display unit of a personal computer equipped with an MPEG decoder.

Preferably, the subordinate image may be compressed by run-length coding. The subordinate image thus compressed by run-length coding is used for, e.g., the subtitles of video or karaoke.

Preferably, in case of a synthesis ratio in which there are 16 contrast values of 0 to 15, processing for translucently combining data is executed in accordance with the following:

$$Y3=[k \times (Y1-Y2)] \div 16$$
$$U3=[k \times (U1-U2)] \div 16$$
$$V3=[k \times (V1-V2)] \div 16$$

where k=contrast value+1 (provided that k=0 holds when contrast value=0);
and the following hold:
Y1, U1, V1: chrominance data of main image
Y2, U2, V2: chrominance data of subordinate image
Y3, U3, V3: difference data after synthesis This makes it possible to reduce the load imposed by processing for translucently combining data.

Preferably, the macrob lock storage unit stores the output of the motion compensation processor 124, thereby making it possible to create subordinate image data.

Further, according to a third aspect of the present invention, there is provided an image synthesis method for combining main image data that has been compressed by an MPEG method and subordinate image data that has been compressed by a method different from the MPEG method, the system comprising the steps of: decompressing, on a per-macroblock basis, I-, P- and B-pictures of the main image data, which has first been subjected to inverse quantization and inverse DCT processing; storing a macroblock of the I-picture of the main image data; and converting the subordinate image data to an MPEG macroblock, translucently combining data of a macroblock having a portion which overlaps the subordinate image and data of a macroblock that has been stored, and decompressing data of the translucently combined macroblocks as a macroblock of the B-picture at the time of decompression.

The image synthesis method is typically performed using a corresponding program or program product which may be carried on a medium in a computer readable fashion.

Thus, as set forth above, the image of a created B-picture combined with a subordinate image is decompressed by the motion compensation processor. This makes it possible to reconstruct a synthesized image. In addition, the load of synthesis processing is reduced and it is no longer necessary to provide special hardware for the display unit of a personal computer equipped with an MPEG decoder.

Other features and advantages of the present invention will be apparent from the following description taken in conjunction with the accompanying drawings, in which like reference characters designate the same or similar Parts throughout the figures thereof.

DESCRIPTION OF THE PREFERRED EMBODIMENT

A preferred embodiment of the present invention will now be described in detail with reference to the drawings.

Figure 1:
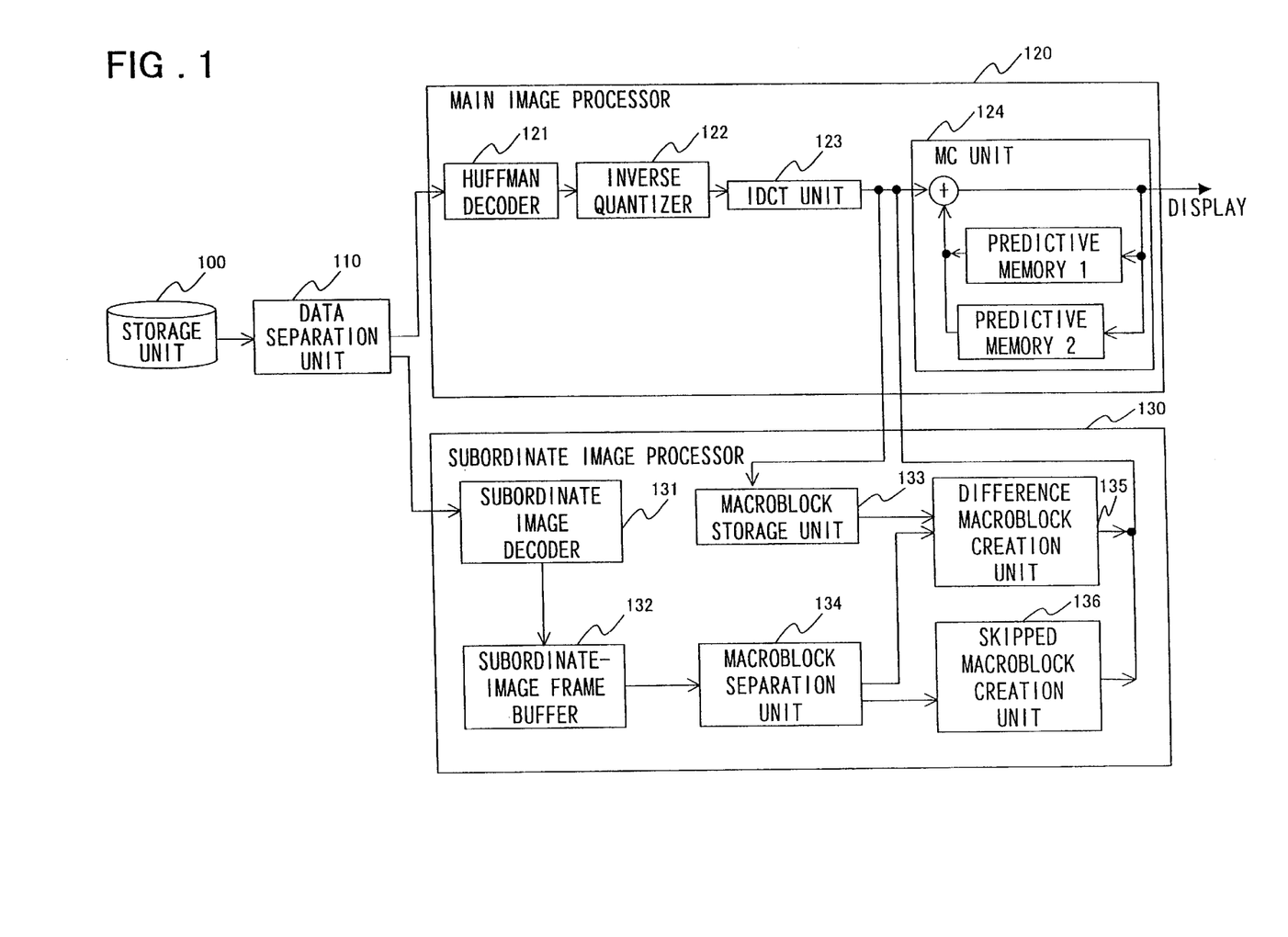
FIG. 1 is a block diagram illustrating the construction of an image synthesis system according to a preferred embodiment of the present invention.

FIG. 1 is a block diagram illustrating the construction of an image synthesis system according to a preferred embodiment of the present invention. As illustrated in FIG. 1 the image synthesis system is provided with a storage unit 100 in which multiplexed data has been stored. The multiplexed data is main image data that has been compressed and coded by the MPEG coding method or the like and subordinate image data such as video or karaoke subtitles that has been compressed and coded by run-length coding.

A data separation unit 110 is connected to the storage unit 100 and executes the compressed main image data and compressed subordinate image data from the multiplexed data read out of the storage unit 100. Connected to the data separation unit 110 are a main image processor 120 to which the separated compressed main image from the storage unit 100 is input, and a subordinate image processor 130 to which the separated compressed subordinate image from the storage unit 100 is input.

The main image processor 120 is provided with a Huffman decoder 121, which is connected to the data separation unit 110 for applying Huffman decoding processing to the image data that has been compressed and coded such as by MPEG coding. An inverse quantizer 122 is connected to the Huffman decoder 121 and applies inverse quantization processing to the image data that has been compressed and coded as by MPEG coding.

An IDCT (Inverse Discrete Cosine Transform) unit 123 is connected to the inverse quantizer 122 and applies IDCT processing to the image data that has been compressed and coded such as by MPEG coding.

A motion compensation (MC) unit 124 is connected to the IDCT unit 123 and receives as an input the data that has been subjected to IDCT processing, namely one picture's worth of macroblock data. The MC unit 124 applies MC processing to the image data that has been compressed and coded such as by MPEG coding and displays the motion-compensated image data as image data representing one image.

A macroblock storage unit 133 in the subordinate image processor 130 is connected to the IDCT unit 123 and stores macroblock data of an I-picture (described later) contained in the image data that has undergone IDCT processing. A subordinate image decoder 131 is provided in the subordinate image Processor 130 and applies decoding processing to the subordinate image that has been compressed and coded such as by run-length coding.

A subordinate-image frame buffer 132 is connected to the subordinate image decoder 131 and stores image data that has been decoded by the subordinate image decoder 131. A macroblock separation unit 134 is connected to the subordinate-image frame buffer 132 and separates image data, which is being retained by the subordinate-image frame buffer 132, as macroblock data compliant with the MPEG standard.

A difference macroblock creation unit 135 is connected to the macroblock separation unit 134. In a case where a macroblock separated by the macroblock separation unit 134 overlaps a position on the subordinate image, the difference macroblock creation unit 135 reads macroblock data at the same position as that of the separated macroblock out of the macroblock storage unit 133 and creates macroblock data, which has undergone translucent synthesis processing, as difference macroblock data corresponding to the I-picture.

The difference macroblock data created by the difference macroblock creation unit 135 is output to the input side of the MC unit 124 in the main image processor 120.

A skipped macroblock creation unit 136 is connected to the macroblock separation unit 134. A macroblock among macroblocks separated by the macroblock separation unit 134 having a portion that does not overlap the position of the subordinate image is treated as a skipped macroblock by the macroblock separation unit 134, which so notifies the skipped macroblock creation unit 136.

Difference macroblock data is zero in case of a skipped macroblock.

Upon being notified of a skipped block by the macroblock separation unit 134, the skipped macroblock creation unit 136, which is connected to the input side of the MC unit 124, notifies the MC unit 124 of the skipped macroblock as by a flag or the like and outputs skipped-block data to the input side of the MC unit 124.

When a subordinate image is processed, macroblock data created as a B-picture in the subordinate image processor 130 enters the input side of the MC unit 124 in main image processor 120.

When a subordinate image is processed, the MC unit 124 applies MC processing to the macroblock data of the B-picture created by the subordinate image Processor 130 and displays the MC-compensated image data as image data representing one image.

Figure 2:
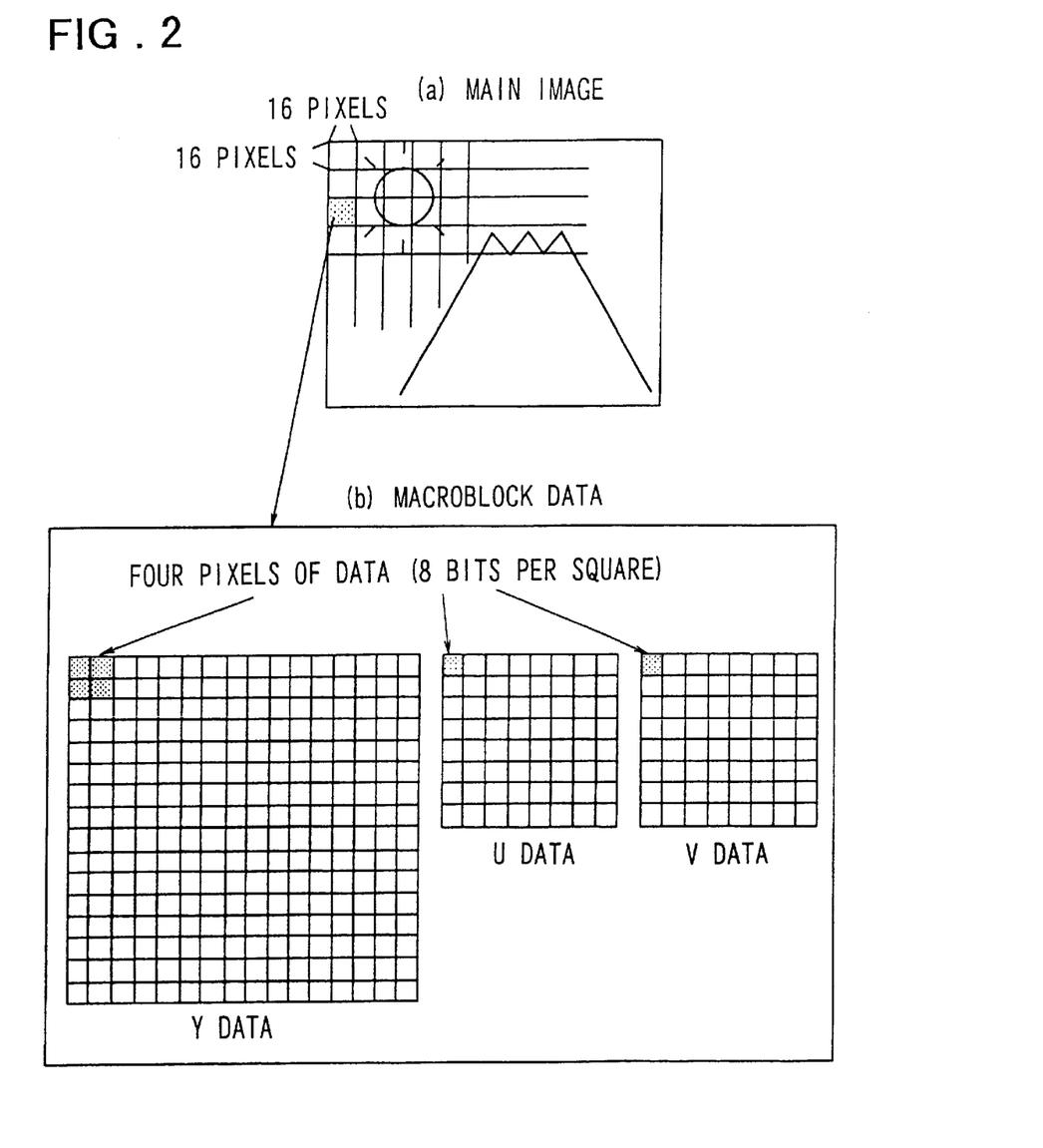
FIG. 2 is a diagram illustrating the format of macroblock data of a main image.

FIG. 2 is a block diagram illustrating the format of macroblock data of a main image. As shown in (a) of FIG. 2, macroblock data that has been subjected to IDCT processing by the IDCT unit 123 and input to the MC unit 124 in main image processor 120 is assumed to be data in the YUV (Y: a luminance signal; U: an R-V color difference signal; V: a B-Y color difference signal; R: red; B: blue) format composed of 16 pixels vertically and 16 Pixels horizontally.

As shown in (b) of FIG. 2, it is assumed that U and V data has half the number of pixels of the Y data in both the vertical and horizontal directions, and that one pixel (consisting of eight bits) of each of the U and V data corresponds to four pixels (each consisting of eight bits) of the Y data.

Figure 3:
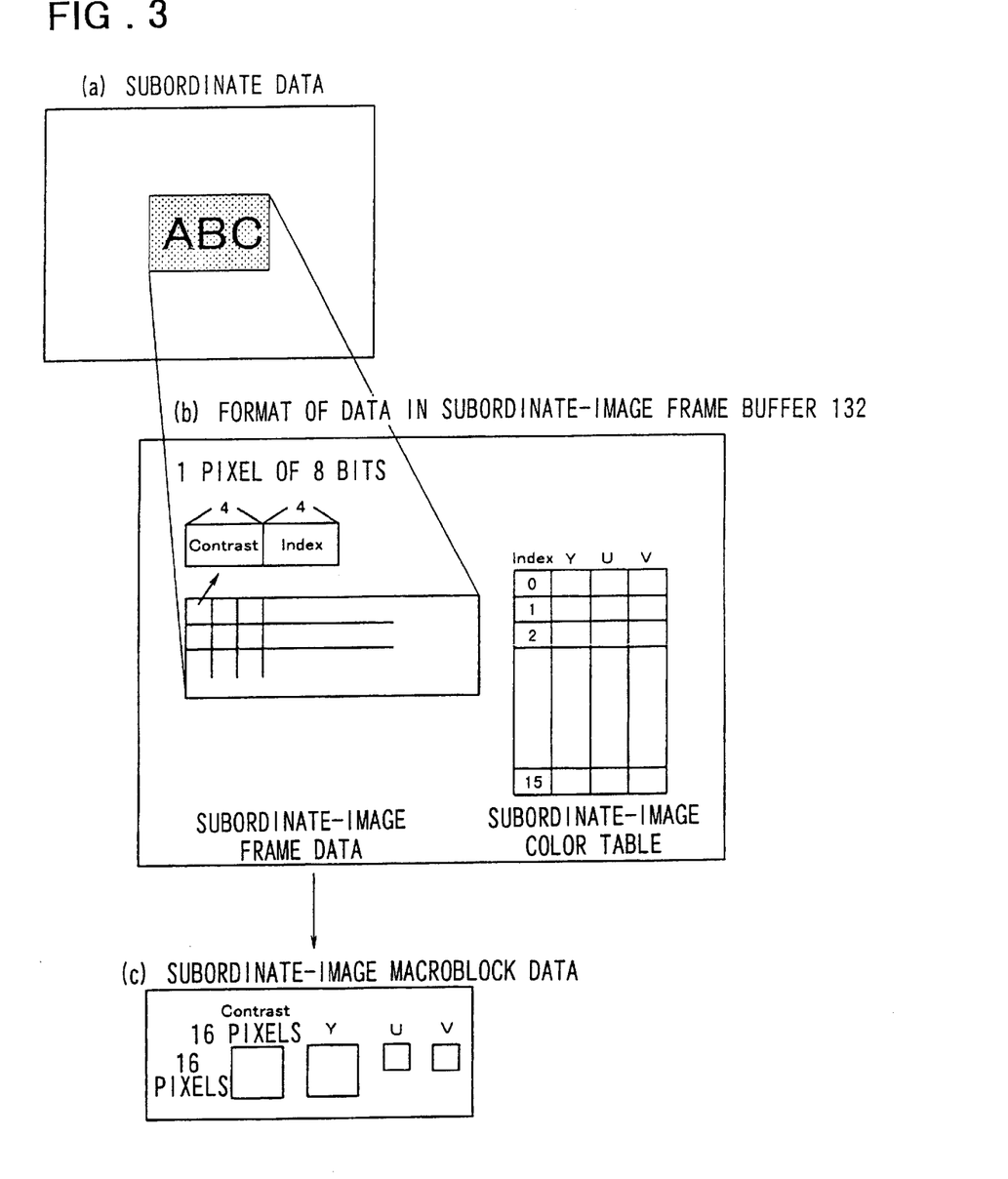
FIG. 3 is a diagram illustrating the format of macroblock data stored in a subordinate-image frame buffer in the system of FIG. 1.

FIG. 3 is a diagram illustrating the format of macroblock data stored in the subordinate-image frame buffer 132. The format of the subordinate image data that has been decoded by the subordinate image decoder 131 of subordinate image processor 130 and stored in the subordinate-image frame buffer 132 in the manner shown in (a) of FIG. 3 is such that, as shown in (b) of FIG. 3, the data is composed of 8-bit subordinate-image frame data comprising a 4-bit contrast value (Contrast) that can take on values of 0 to 15 per pixel and a 4-bit index value (Index) that can take on values of 0 to 15; and a subordinate-image color table for looking up the 8-bit chrominance data of each of Y, U and V based upon the 4-bit index number.

It is assumed that the format of the macroblock of the subordinate image output from the macroblock separation unit 134 is such that the data is composed of YUV data and contrast values of 16 pixels vertically and 16 pixels horizontally.

Here a contrast value of 0 represents transparency, a contrast value of 15 represents opaqueness and contrast values of 1 to 14 represent semitransparency.

Figure 4:
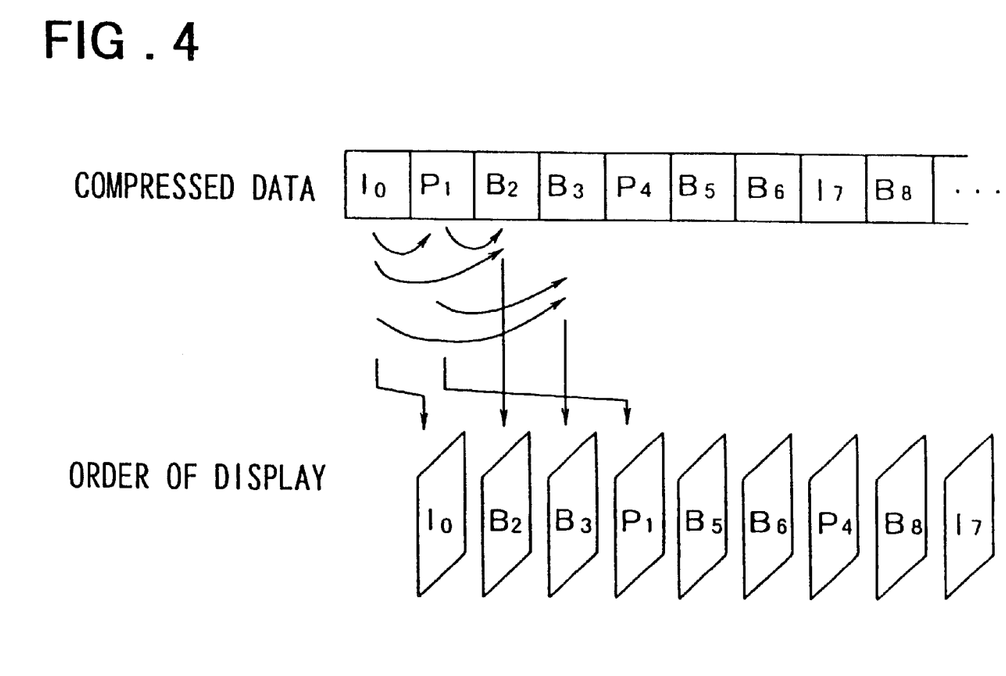
FIG. 4 is a diagram illustrating the picture composition of main image data in the MPEG system.

FIG. 4 is a diagram illustrating the picture composition of main image data according to the MPEG system. MPEG picture types include an I-picture (intra-coded picture) type, which is capable of being decompressed without making reference to any other pictures; a P-picture (predictive-coded picture) type, which is decompressed using a past I-picture or P-picture; and a B-picture (bidirectionally predictive-coded Picture) type, which is decompressed by referring to two I-pictures or P-pictures.

The order of pictures which appear in compressed data and the order of displayed pictures are different. If the order of the pictures in compressed data is assumed to be I0, P1, B2, B3, P4, B5, B6, I7, . . . , as shown in FIG. 4, then the order of display will be I0, B2, B3, P1, B5, B6, P4, B8, I7, . . . Thus an I-picture or P-picture immediately preceding a B-picture in the compressed data is displayed after the B-picture.

It should be noted that I, P and B in FIG. 4 represent the picture types and that the numerical subscripts following the picture types indicate the order in which the picture appears in the compressed data.

Thus, I- and P-pictures are referred to as reference pictures by other pictures but B-pictures are not referred to by other pictures. In other words, I- or P-pictures are stored in predictive memories 1, 2 in the MC unit 124 but B-pictures are not.

The MC unit 124 refers to each of these pictures and executes processing such as decompression.

In this embodiment, the B-pictures are not used for reference purposes and therefore the embodiment adopts a method in which image data with which subordinate image data has been combined is processed as MPEG B-picture data.

Figure 5:
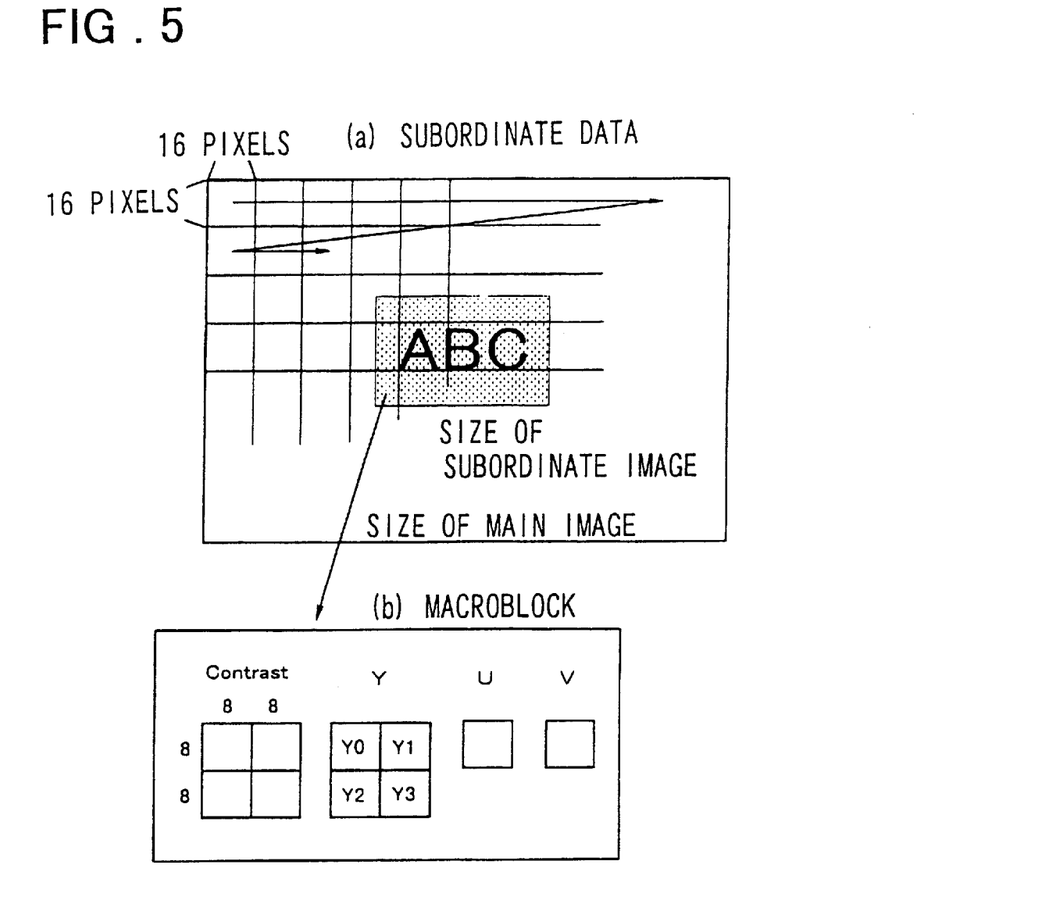
FIG. 5 is a diagram useful in describing macroblock data created by a macroblock separation unit in the system of FIG. 1.

FIG. 5 is a diagram useful in describing macroblock data created by the macroblock separation unit 134.

As shown in (a) of FIG. 5. the macroblock separation unit 134 extracts macroblock data composed of 16 pixels vertically and 16 pixels horizontally from the subordinate-image frame buffer 132 in regular order traveling rightward from a point to the upper left of the subordinate image in the size of the main image.

A macroblock in the macroblock data extracted by the. macroblock separation unit 134 having a portion that overlaps the subordinate image is treated as contrast, Y, U, V subordinate-image macroblock block data of 16 pixels vertically and 16 pixels horizontally.

The Y subordinate-image macroblock block data is divided into Y0, Y1, Y2 and Y3 portions in order to perform calculations for translucent synthesis, described later.

Of the macroblock data that has been extracted by the macroblock separation unit 134, macroblock data in the main image size that does not overlap the subordinate image is treated as skipped data and the macroblock separation unit 134 so notifies the skipped macroblock creation unit 136, as described earlier.

Figure 6:
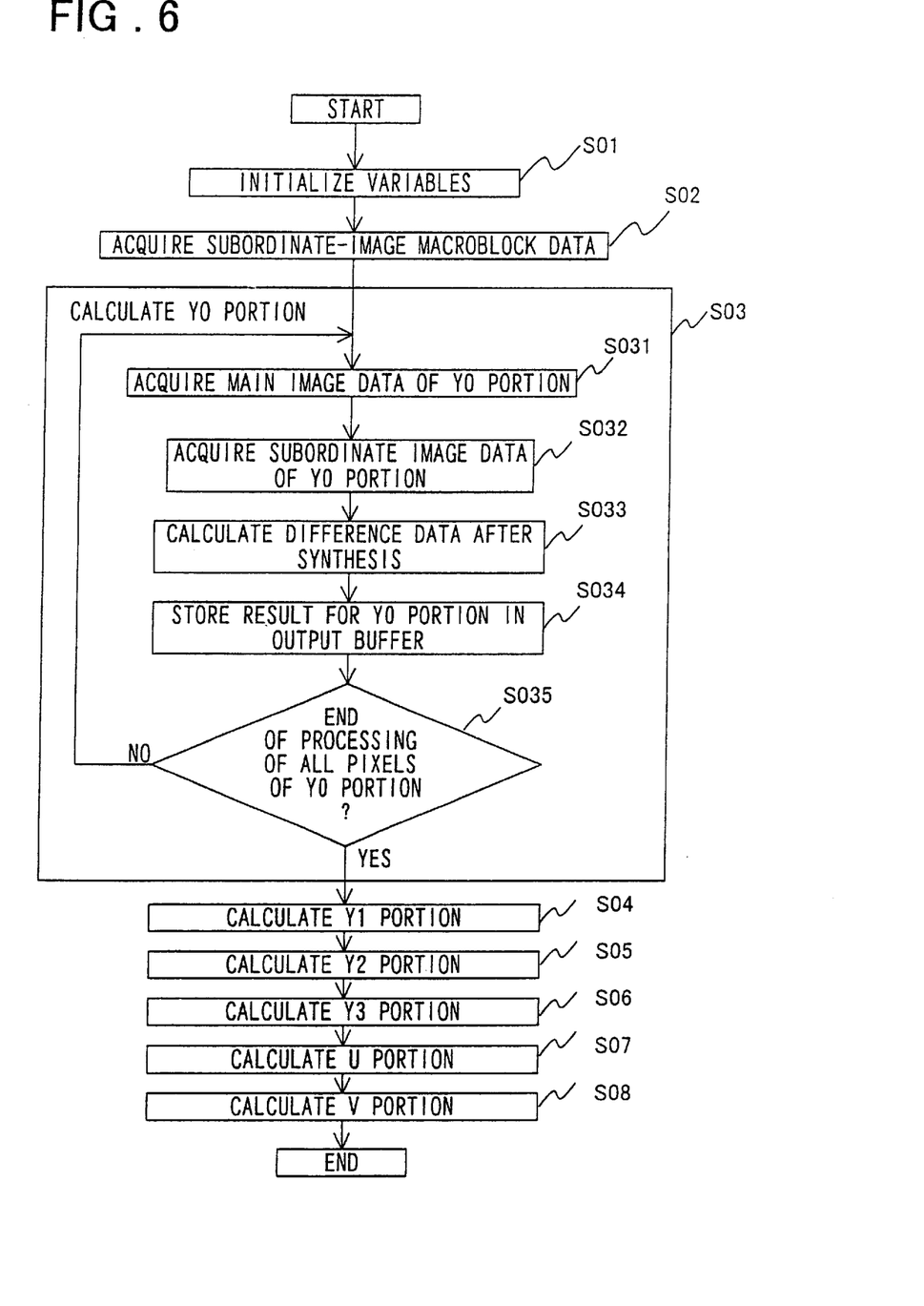
FIG. 6 is a flowchart illustrating the flow of processing executed by a difference macroblock creation unit in the system of FIG. 1.
Figure 7:
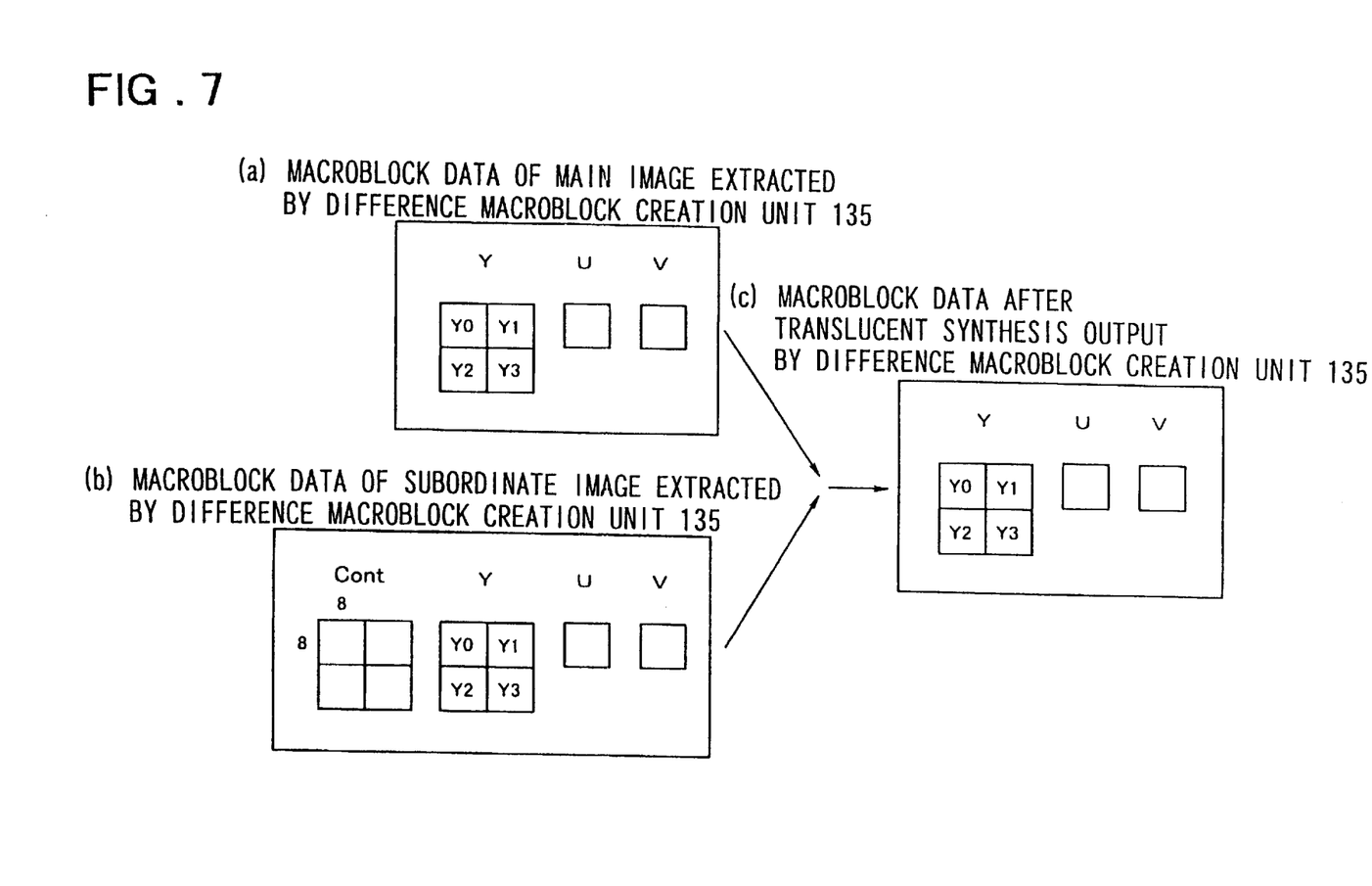
FIG. 7 is a diagram illustrating the data structure of a macroblock in the difference macroblock creation unit.

FIG. 6 is a flowchart illustrating the flow of processing executed by the difference macroblock creation unit 135, and FIG. 7 is a diagram illustrating the data structure of a macroblock in the difference macroblock creation unit 135. In FIG. 7, (a) illustrates macroblock data of the main image extracted by the difference macroblock creation unit 135, (b) macroblock data of the subordinate image extracted by the difference macroblock creation unit 135, and (c) difference macroblock data, which is obtained by translucently combining the main and subordinate images macroblock data, output by the difference macroblock creation unit 135.

At step S01 in FIG. 6, the difference macroblock creation unit 135 initializes the related variables. This is followed by step S02, at which the difference macroblock creation unit 135 acquires one macrob lock of data from the subordinate-image frame buffer 132. The acquired macroblock data is assumed to be YUV data and contrast data of 16 pixels vertically and 16 pixels horizontally, as depicted in (a), (b) of FIG. 7. However, the size of the U, V data is half that of the Y data in both the vertical and horizontal directions in accordance with the MPEG data format.

Next, at steps S03 to S08, the difference macroblock creation unit 135 calculates, as a B-picture, difference macroblock data after synthesis in the order of the Y0, Y1, Y2, Y3, U and V portions of the macroblock data shown in (a) of FIG. 7 and stores the result of calculation in an output buffer (not shown).

More specifically, the difference macroblock creation unit 135 acquires the main image data having the format shown in (a) of FIG. 7 at step S031, acquires the subordinate image data having the format shown in (b) of FIG. 7 at step S032, calculates difference macroblock data after synthesis as a B-picture at step S033, and stores the result of calculation in an output buffer (not shown) in the format shown in (c) of FIG. 7 at step S034.

In case of a synthesis ratio in which there are 16 contrast values of 0 to 15 as in this embodiment, the difference calculation after synthesis is performed in accordance with the following equations at step S035:

$$Y3=[k\times(Y1-Y2)]\div16$$

$$U3=[k\times(U1-U2)]\div16$$

$$V3=[k\times(V1-V2)]\div16$$

where k=contrast value+1 (provided that k=0 holds when contrast value=0);
and the following hold:
Y1, U1, V1: chrominance data of main image
Y2, U2, V2: chrominance data of subordinate image
Y3, U3, V3: difference data after synthesis The difference macroblock creation unit 135 checks to determine whether all pixels (eight pixels vertically and eight pixels horizontally) of the Y0 portion have been processed and repeats the processing of steps S031 to S034 until all processing relating to this portion is completed.

The steps S04 to S08 call for the difference macroblock creation unit 135 to apply processing similar to that of step S03 to the Y1, Y2, Y3, U and V portions, thereby completing macroblock creation processing for one macroblock.

The foregoing is a description of a method of converting subordinate image data to macroblock data in the MPEG format. In this embodiment, the macroblock data obtained by the conversion is processed as a B-picture in accordance with the MPEG standard. The reason for this is that in the case of a B-picture, no reference is made to the B-picture by other pictures, even when a main image is combined with a subordinate image, and the B-picture is displayed immediately after decoding.

In a case where subordinate image data is created as an I-picture or P-picture, there is the possibility that this picture will be utilized as a reference picture when the main image is decoded.

The macroblock data obtained by the conversion is processed as a B-picture in this embodiment to prevent the unlawful decoding of main image data. However, if the main image processor 120 performs additional control in such a manner that the I- or P-picture will not be utilized as a reference picture, then it will be possible to create the subordinate image data as an I-picture or P-picture.

According to this embodiment, the output of the IDCT unit 123 is stored in the macroblock storage unit 133. If the main image data is an I-picture in this case, the subordinate image data can be created. However, if the main image data is a P-picture or B-picture, there will be no reference picture data and, as a consequence, it will not be possible to create normal subordinate image data.

In a case where it is necessary to create subordinate image data even if the main image data is a P- or B-picture, it will suffice to store the output of the MC unit 124 in the macroblock storage unit 133.

Thus, in accordance with the present invention, as described above, it is possible to avoid referring to an image combined with a subordinate image when the main image is decoded even if the main image processor 120 does not execute additional processing. The reason for this is as follows: When a compressed image such as one in conformity with the MPEG standard is decoded, there are cases where decoding is carried out by referring to other pictures. With the present invention, however, use is made of the B-picture to which no reference is made by other pictures.

Next, in accordance with the present invention, the display unit of a personal computer equipped with an MPEG decoder for which there is not enough CPU processing power need not be provided with special hardware. The reason for this is that the image synthesis processing is so adapted that use is made of processing for translucently combining a subordinate image with a main image utilizing MC processing in a standard MPEG system.

Further, in accordance with the present invention, it is possible to reduce the load associated with synthesis processing when combining a subordinate image such as video or karaoke subtitles with a main image. The reason for this is that whereas calculation for ordinary translucent synthesis is performed in accordance with Equation (1) below, calculation in the present invention is Performed in accordance with Equation (2), as a result of which the amount of calculation is reduced.

$$Y3=[k\times Y2+(16-k)\times Y1]\div16 \qquad (1)$$

$$Y3=[k\times(Y1-Y2)]\div16 \qquad (2)$$

A P-picture and a B-picture in accordance with the MPEG standard constitutes difference data with respect to a reference picture. Since the MC unit 124 merely adds a picture to a reference picture, it will suffice to create the data prior to the addition operation in the calculation of the difference after translucent synthesis is performed.

Furthermore, the number of macroblocks created by the difference macroblock creation unit 135 need only be the number of macroblocks in which a subordinate image is contained. Little processing is necessary in a case where the size of the subordinate image is small, as when the subordinate image is a subtitle of picture motion or video.

Further, in accordance with the present invention, a main image and a subordinate image can be combined without accessing image data displayed after decoding. The reason for this is that the data of the subordinate image is combined with macroblock data after application of the IDCT.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An image synthesis system for combining main image data that has been compressed by an MPEG method and subordinate image data that has been compressed by a method different from the MPEG method, the system comprising:

motion compensation processor decompressing, on a per-macroblock basis, I-, P- and B-pictures of the main image data, which has first been subjected to inverse quantization and inverse DCT processing;

a macroblock storage unit storing a macroblock of the I-picture of the main image data; and a subordinate-image macroblock generator converting the subordinate image data to an MPEG macroblock, translucently combining data of a macroblock having a portion which overlaps the subordinate image and data of a macroblock that has been stored in said macroblock storage unit, and creating data of the translucently combined macroblocks as a macroblock of the B-picture, which is decompressed by said motion compensation processor.

2. An image synthesis system for combining main image data that has been compressed by an MPEG method and subordinate image data that has been compressed by a method different from the MPEG method, the system comprising:

motion compensation processor decompressing, on a per-macroblock basis, I-, P- and B-pictures of the main image data, which has first been subjected to inverse quantization and inverse DCT processing, and performing control in such a manner that use is not made of reference I and P-pictures among the I- and P-pictures;

a macroblock storage unit storing a macroblock of the I-picture of the main image data; and a subordinate-image macroblock generator converting the subordinate image data to an MPEG macroblock, translucently combining data of a macroblock having a portion which overlaps the subordinate image and data of a macroblock that has been stored in said macroblock storage unit, and creating data of the translucently combined macroblocks as macroblocks of the reference I- and P-pictures not utilized by the motion compensation processor.

3. The system according to claim 1, the subordinate image has been compressed by run-length coding.

4. The system according to claim 2, the subordinate image has been compressed by run-length coding.

5. The system according to claim 1, wherein processing for translucently combining the data is executed in accordance with the following in case of a synthesis ratio in which there are 16 contrast values of 0 to 15:

$$Y3=[k\times(Y1-Y2)]\div 16$$

$$U3=[k\times(U1-U2)]\div 16$$

$$V3=[k\times(V1-V2)]\div 16$$

where k=contrast value+1 (provided that k=0 holds when contrast value=0);

and the following hold:
Y1, U1, V1: chrominance of main image
Y2, U2, V2: chrominance of subordinate image
Y3, U3, V3: difference data after synthesis.

6. The system according to claim 2, wherein processing for translucently combining the data is executed in accordance with the following in case of a synthesis ratio in which there are 16 contrast values of 0 to 15:

$$Y3=[k\times(Y1-Y2)]\div 16$$

$$U3=[k\times(U1-U2)]\div 16$$

$$V3=[k\times(V1-V2)]\div 16$$

where k=contrast value+1 (provided that k=0 holds when contrast value=0);

and the following hold:
Y1, U1, V1: chrominance of main image
Y2, U2, V2: chrominance of subordinate image
Y3, U3, V3: difference data after synthesis.

7. The system according to claim 1, wherein said macroblock storage unit stores output of said motion compensation processor.

8. The system according to claim 2, wherein said macroblock storage unit stores output of said motion compensation processor.

9. The system according to claim 1, wherein said subordinate-image macroblock generator comprises a difference macroblock creation unit and a macroblock separation unit separating a macroblock having a portion which overlaps the subordinate image from macroblocks not having a portion which overlaps the subordinate image, and supplying the separated macroblock to said difference macroblock creation unit, wherein said difference macroblock creation unit processes a difference data between an output data of said macroblock storage unit and an output data of said macroblock separation unit, macroblock by macroblock, and wherein an output of said difference macroblock creation unit is supplied to said motion compensation unit.

10. The system according to claim 9, wherein said subordinate-image macroblock generator comprises a skipped macroblock creation unit which receives macroblocks not having a portion which overlaps the subordinate image from said macroblock separation unit and supplies skipped macroblocks to said motion compensation processor.

11. The system according to claim 1, wherein the system comprises a data separation unit which separates image data into said main image data and said subordinate image data which is supplied to said macroblock separation unit.

12. The system according to claim 1, wherein said macroblock storage unit receives resultant data of said inverse DCT processing of the main image data.

13. An image synthesis system for combining main image data that has been compressed by an MPEG method and subordinate image data that has been compressed by a method different from the MPEG method, the system comprising:

motion compensation processor decompressing, on a per-macroblock basis, I-, P- and B-pictures of the main image data, which has first been subjected to inverse quantization and inverse DCT processing;

a macroblock storage unit storing a macroblock of the I-picture of the main image data; and a subordinate-image macroblock generator converting the subordinate image data to an MPEG macroblock, translucently combining data of a macroblock having a portion which overlaps the subordinate image and data of a macroblock that has been stored in said macroblock storage unit, and creating data of the translucently combined macroblocks as a macroblock of the B-pictures, which is decompressed by said motion compensation processor, wherein said a subordinate-image macroblock generator further creating data of the translucently combined macroblocks as macroblocks of the reference I- and P-pictures not utilized by the motion compensation processor.

14. An image synthesis method for combining main image data that has been compressed by an MPEG method and subordinate image data that has been compressed by a method different from the MPEG method, the system comprising the steps of:
- decompressing, on a per-macroblock basis, I-, P- and B-pictures of the main image data, which has first been subjected to inverse quantization and inverse DCT processing;
- storing a macroblock of the I-picture of the main image data; and
- converting the subordinate image data to an MPEG macroblock, translucently combining data of a macroblock having a portion which overlaps the subordinate image and data of a macroblock that has been stored, and decompressing data of the translucently combined macroblocks as a macroblock of the B-picture at the time of decompression.

15. The method according to claim 14, wherein said combining data is performed by calculating a difference data, macroblock by macroblock, between the data of the macroblock having a portion which overlaps the subordinate image and the stored data of the macroblock of the main image data.

16. The method according to claim 14, wherein said calculating the difference comprises calculating a difference on each of signals Y, U and V, pixel by pixel constituting a macro block.

* * * * *